United States Patent [19]
Fujita et al.

[11] 3,843,630
[45] Oct. 22, 1974

[54] PRODUCTION OF ε-CAPROLACTAM
[75] Inventors: Isamu Fujita, Ikeda; Kiyoshi Otoi, Suita; Tooru Yoneya, Toyonaka, all of Japan
[73] Assignee: Kanebo, Ltd., Tokyo, Japan
[22] Filed: Feb. 1, 1973
[21] Appl. No.: 328,653

[30]  Foreign Application Priority Data
   Feb. 15, 1972  Japan.............................. 47-15750

[52] U.S. Cl. .................. 260/239.3 A, 260/239.3 R
[51] Int. Cl............................................ C07d 41/06
[58] Field of Search............................. 260/239.3 A

[56] References Cited
UNITED STATES PATENTS
3,689,477   9/1972   Fujita et al................... 260/239.3 A Primary Examiner—John D. Randolph
Assistant Examiner—Robert T. Bond
Attorney, Agent, or Firm—Wenderoth, Lind & Ponack

[57] ABSTRACT

The present invention relates to a process for producing ε-caprolactam which comprises bringing N-acetyl-ε-caprolactam into contact in a gaseous phase with an acid catalyst or basic catalyst in the presence of water vapor.

10 Claims, No Drawings

PRODUCTION OF ε-CAPROLACTAM

This invention relates to a process for producing ε-caprolactam and more particularly to a process for producing ε-caprolactam by bringing N-acetyl-ε-caprolactam into contact in a gaseous or vapor phase with a specific acidic catalyst or basic catalyst in the presence of water vapor.

There is already known a process for producing ε-caprolactam by the Beckmann rearrangement of cyclohexanone oxime in the presence of a large excess of concentrated sulfuric acid. This process has been industrially put into practice but has a disadvantage in that there is formed a large amount of ammonium sulfate as a by-product.

As a result of research on a process for producing ε-caprolactum without the by-production of ammonium sulfate, we have now found that ε-caprolactam can be obtained easily by deacetylating the starting material N-acetyl-ε-caprolactam.

We have further found that the hydrolysis of N-acetyl-ε-caprolactum in the liquid phase in the presence of an acid catalyst or alkali catalyst has a disadvantage in that a large amount of aminocaproic acid is produced as a by-product and the yield of ε-caprolactam is considerably reduced, but that in case N-acetyl-εcaprolactam is brought, in a gaseous phase, into contact with a particular acid catalyst or basic catalyst in the presence of steam or water vapor, ε-caprolactam can be obtained at a high yield and with high purity.

An object of the present invention is to provide a novel process for producing ε-caprolactam of high purity industrially easily at a high yield.

Another object of the present invention is to provide a novel process for de-acetylating N-acetyl-ε-caprolactam.

Other objects of this invention will become apparent from the following description.

In carrying out this invention it is preferable to bring N-acetyl-ε-caprolactam together with water vapor into contact in a gaseous phase with at least one solid acid catalyst selected from the group consisting of silica-alumina catalysts, silica-magnesia catalysts, silica-zirconia catalysts, alumina-boria catalysts, phosphoric acid catalysts supported by carrier, alumina catalysts containing fluorine and zeolite catalysts or with at least one solid basic catalyst of sodium hydroxide, potassium hydroxide, lithium hydroxide, barium hydroxide, sodium carbonate or potassium carbonate supported on a carrier such as silica gel, alumina, Celite (Trademark of Johns Manville Sales Corp.) or active carbon.

In carrying out the vapor phase reaction of the present invention, a thermostatic reactor is filled with one of the above mentioned catalysts and is heated by a suitable means such as a molten salt bath or the like. The vapor of N-acetyl-εcaprolactam and steam are passed simultaneously or a gaseous mixture of the both is passed through the reactor so as to contact with said catalyst in a vapor phase. In this case, the above mentioned vapor may be diluted with an inert gas such as nitrogen, carbon dioxide or hydrogen. Further, the catalyst in the reactor may be in the form of a fixed bed or it may be in the form of a fluidized bed wherein the catalyst is used in finely powdered form.

The catalyst to be used in the present invention is an acid catalyst such as silica-alumina catalyst, silica-magnesia catalyst, silica-zirconia catalyst, alumina-boria catalyst, phosphoric acid catalyst supported by a carrier, alumina catalyst containing fluorine, zeolite catalyst or a basic catalyst carrying at least one of sodium hydroxide, potassium hydroxide, lithium hydroxide, barium hydroxide, sodium carbonate and calcium carbonate on a carrier such as silica gel, alumina, Celite or active carbon. Each catalyst is used in the form of solid. These catalysts will be explained in the following.

The silica-alumina catalyst is formed of silica and alumina. Usually a synthetic material is used, but it is also possible to employ a naturally produced clay material such as acid clay or active clay. In preparing silica-alumina catalyst, silica gel and alumina are kneaded together as wet, or aluminum salt is deposited on silica gel by dipping, or silica and alumina are simultaneously precipitated from an aqueous solution, or alumina-gel is precipitated on silica gel. Then each of these products is dried, molded and roasted or fired. The roasting or firing temperature is in a range of 300° to 1,300°C., preferably 400° to 1,000°C. The roasting time is in a range of 0.5 to 100 hours, preferably 1 to 50 hours. The preferable composition of the catalyst is in the range of the weight ratio of $SiO_2:Al_2O_3$ of 10:90 to 99:1, preferably of 60:40 to 95:5.

The zeolite catalyst to be used in the present invention is a specific zeolite which is a crystalline alumisilicate having a three-dimensional network structure and has a 12-member oxygen ring within the crystal structure and contains specific cations as explained below.

Thus the 12-member oxygen ring is of a crystal structure of a zeolite wherein 12 Si or Al atoms are annularly connected together through oxygen atoms and becomes a passage for the reactant molecules to be diffused and adsorbed to the active sites in the catalyst. With a zeolite having only an oxygen ring smaller than the 12-member oxygen ring, the reactant molecules can not reach the active sites of the catalyst so that it can scarcely show catalytic activity. Known today as zeolites having such 12-member oxygen rings are natural zeolites such as faujasite and mordenite, and synthetic zeolites such as X-type and Y-type zeolites corresponding to faujasite and Zeolon (trade name of Norton Co.) corresponding to mordenite. However, these zeolites having 12-member oxygen rings are usually inert as they are, so that these are activated by cation exchange to produce active cation sites. Thus, the synthetic zeolites are usually produced as containing exchangable Na cations, of which Na, may be completely or partially replaced by any other metal cations or hydrogen cations to be used. In the case of exchanging Na cations for hydrogen ions, it is necessary to adopt a method wherein the sodium ions of the zeolite are exchanged for $NH_4$ ions and are then thermolyzed. That is to say, the Na cations in the zeolite have characteristic of being easily ion-exchanged in an aqueous solution of a salt of any other metal. The catalytic activity varies depending on the kind of the metal cation. Therefore, by utilizing these properties, a catalyst having a particularly desirable catalytic activity can be prepared.

The specific cations to be used for the exchange of the sodium ions in the zeolite are cations of hydrogen, calcium, magnesium, zinc, silver, palladium, cadmium, copper, molybdenum, tungsten, cerium, lanthanum and neodymium.

By exchanging the sodium ions with a mixture of two or more kinds of ions, a synergistic effect can be obtained. The rate of such specific cations in the total cations in the catalyst, i.e., the ion exchange percentage may be about 20 to 100 percent, preferably 40 to 100 percent to provide a desirable catalytic activity.

Each of the silica-magnesia catalyst and silica-zirconia catalyst can be prepared by a conventional method. Thus, for example, the silica-magnesia catalyst may be prepared by obtaining a silica-magnesia hydrogel by a process wherein a silica gel is dipped in a magnesium salt solution and is then neutralized with ammonia water, a process wherein a silica hydrogel obtained from water glass is well kneaded with magnesium oxide or magnesium hydroxide or a process wherein a slurry of magnesium oxide is added to a silica hydrogel and all is coagulated. After drying the thus obtained silica-magnesia hydrogel at 100° to 120°C., it is activated at 400° to 600°C. The composition of the silica-magnesia ($SiO_2$-MgO) catalyst is of a weight ratio of $SiO_2$:MgO of 0.5:1 to 5:1, preferably 1.5:1 to 3:1.

The silica-zirconia ($SiO_2$-$ZrO_2$) catalyst may be produced by impregnating silica with zirconium nitrate and roasting or firing the same or by adding ammonia to a mixture of a silica sol and zirconium nitrate and roasting or firing the produced precipitate. It is preferable to carry out the roasting at 500° to 800°C. The catalyst composition is of a weight ratio of $SiO_2$:$ZrO_2$ of 9:1 to 0.2:1, preferably 5:1 to 1:1.

The alumina-boria catalyst or fluorine-containing alumina catalyst may be easily prepared by adding boric acid or a fluorine compound to aluminum oxide obtained by dehydrating an alumina hydrate and roasting or firing the same. For example, it is produced by dipping aluminum oxide in an aqueous solution of a fluorine compound or boric acid and then drying, molding and firing the same. In the case of a fluorine compound easy to vaporize or gasify, alumina may be treated with a gaseous fluorine compound. For the fluorine compound there may be used a hydrofluoric alkali metal, hydrogen fluoride, ammonium fluoride, tetrafluoroboric acid or antimony fluoride.

The composition of the alumina catalyst may be of a weight ratio of $Al_2O_3$:$B_2O_3$ of 99:1 to 40:60, preferably 95:5 to 70:30.

The composition of the alumina catalyst containing fluorine is of a weight ratio of $Al_2O_3$:F of 99.95:0.05 to 70:30, preferably 99.5:0.5 to 85:15.

The phosphoric acid catalyst supported on a carrier may be prepared by adding phosphoric acid to a suitable carrier such as diatomaceous earth or Celite, well agitating the mixture and then heat-treating the same to be activated. The ratio of the above mentioned carrier to the phosphoric acid is preferably 1:0.1 to 1:10. The catalyst can be also prepared by depositing phosphoric acid on a carrier of alumina or silica-gel and then heat-treating the same.

When such acid catalyst is used, the acetyl group of N-acetyl-ε-caprolactam can be recovered substantially quantitatively as acetic acid. Further, even if the catalyst is reduced in the activity by the deposition of the carbide or the like thereon, the catalyst may be easily reactivated by heat-treating the same.

The basic catalyst to be used in this invention may be prepared by dipping a suitable carrier such as a silica gel, alumina, celite or active carbon in an aqueous solution of sodium hydroxide, potassium hydroxide, lithium hydroxide, barium hydroxide, sodium carbonate or potassium carbonate and then removing water so that at least one of the above mentioned hydroxides and carbonates may be supported on the carrier. The amount of the above mentioned compound per 100 g. of the carrier is preferably 1 to 30 g.

In the process of the present invention, the vapor phase reaction temperature of the present invention may vary depending on the particular catalyst, but is preferably 150° to 450°C., more preferably 200° to 350°C. The reaction pressure may be in a range of 0.1 to 1,000 mm.Hg, preferably 1 to 800 mm.Hg.

Further, the rate of feed of N-acetyl-ε-caprolactam may be in a range of 0.1 to 50 kg./hr. per kg. of the catalyst, preferably 0.5 to 30 kg.

The novel feature of the present invention is to produce ε-caprolactam at high purity and high yield by feeding gaseous N-acetyl-ε-caprolactam (starting material) and water vapor as a gaseous mixture or separately and simultaneously into a reactor filled with the before mentioned solid catalyst so as to contact with said catalyst in a vapor phase.

The amount of water vapor or steam to be used that is, the mol ratio of N-acetyl-ε-caprolactam to steam is 1:0.5 to 1:50, preferably 1:1 to 1:30. When the mol ratio is less than 1:0.5, the yield of ε-caprolactam will tend to reduce. When it is more than 1:50, the yield of ε-caprolactam will reduce and it will be difficult to separate ε-caprolactam from the resulting reaction mixture.

The resulting reaction product contains ε-caprolactam, water, acetic acid and a slight amount of unreacted N-acetyl-ε-caprolactam but the physical properties of the respective components are so different that ε-caprolactam can be separated and purified simply by extraction or distillation.

The present invention will be illustrated in the following examples in which the conversion of N-acetyl-ε-caprolactam and yield of ε-caprolactam were determined by the following formulas:

$$\text{Conversion (\%) of N-acetyl-}\epsilon\text{-caprolactam} = \frac{\text{Amount of converted N-acetyl-}\epsilon\text{-caprolactam (mols)}}{\text{Amount of used N-acetyl-}\epsilon\text{-caprolactam (mols)}}$$

$$\text{Yield (\%) of }\epsilon\text{-caprolactam} = \frac{\text{Amount of produced }\epsilon\text{-caprolactam (mols)}}{\text{Amount of used N-acetyl-}\epsilon\text{-caprolactam (mols)}}$$

EXAMPLE 1

A U-shaped reaction tube of an inside diameter of 15 mm. made of glass was used. One end portion thereof was made as a preheating section, while the other portion was filled with 5.0 g. of a silica-alumina catalyst [N–631(L) ($SiO_2$:$Al_2O_3$ = 87:13) produced by Nikki Chemical Co., Ltd. as crushed to 14 to 35 meshes]. The reaction tube was heated with a molten salt bath from outside and the temperature of the catalyst layer was adjusted to 300°C. The reaction gas coming out of the reaction tube was first cooled with water-cooling tubes and was collected in a receiver cooled with a dry ice-acetone-methanol coolant. This receiver was connected with a vacuum pump through a trap and the pressure within the reaction system was kept at 50 mm.Hg. From the inlet of the reaction tube 15.5 g. (0.1 mol) of N-acetyl-ε-caprolactam and 18.0 g. (1.0 mol) of water vapor were fed at a predetermined rate over 90 minutes and the gaseous mixture was brought into contact with the catalyst layer. There were obtained 32.8 g. of reaction product. Upon quantitative analysis of a part of this reaction product was a gaschromatograph (column; polyethylene gylcol, 150°C.), the yield of ε-caprolactam was 11.2 g. (92.0 percent). Then 20 g. of the reaction product were purified to obtain 6.4 g. of a fraction at 133° to 136°C. under 10 mm.Hg. The infrared spectra of this distillate showed the same absorption values as those of the authentic ε-caprolactam (3.1 mμ, 3.2 mμ, 3.35 mμ, 6.05 mμ, 7.35 mμ, 8.35 mμ, 8.9 mμ, 9.2 mμ, 10.2 mμ, 11.2 mμ, 11.55 mμ, 12.15 mμ and 12.4 mμ). Further, when a mixed melting point test was made with the authentic ε-caprolactam, no melting point drop was observed (m.p. 62.2°C.). It was confirmed from this result that the distilled product was ε-caprolactam.

For comparison, the reaction tube was filled with glass beads (diameter 0.3 mm.) instead of silica-alumina catalyst and a gaseous mixture of 15.5 g. (0.1 mol) of N-acetyl-ε-caprolactam and 18.0 g. (1.0 mol) of water vapor was passed through the reaction tube under the same reaction conditions as above. In this case, the conversion of N-acetyl-ε-caprolactam was 10 percent and the yield of ε-caprolactam was 8.5 percent. Thus, when the catalyst of this invention is not used, the yield of ε-caprolactam is very small.

EXAMPLE 2

Reactions were carried out by varying the reaction temperature and the mol ratio of N-acetyl-ε-caprolactam to water vapor under a reaction pressure of 30 mm.Hg., with the use of the same reaction apparatus as in Example 1 and with the use of 5.0 g. of the same silica-alumina catalyst. The feed rate of N-acetyl-ε-caprolactam was 15.5 g. (0.1 mol)/hr. and the reaction time was 1 hour. The results are shown in Table 1.

Table 1

| Reaction temperature (°C.) | Mol ratio of the starting material to steam | | Conversion (%) of N-acetyl-ε-caprolactam | Yield (%) of ε-caprolactam |
|---|---|---|---|---|
| | N-acetyl-ε-caprolactam (mol) | Steam (mol) | | |
| 130 | 1 | 5 | 18 | 15 |
| | 1 | 20 | 23 | 20 |
| 150 | 1 | 0.1 | 9 | 7 |
| | 1 | 0.5 | 47 | 46 |
| | 1 | 1 | 57 | 55 |
| | 1 | 10 | 80 | 78 |
| | 1 | 30 | 87 | 85 |
| 200 | 1 | 0.1 | 14 | 13 |
| | 1 | 0.5 | 68 | 66 |
| | 1 | 1 | 98 | 96 |
| | 1 | 10 | 100 | 98 |
| | 1 | 30 | 100 | 99 |
| | 1 | 50 | 100 | 94 |
| | 1 | 60 | 85 | 58 |
| 300 | 1 | 1 | 100 | 98 |
| | 1 | 10 | 100 | 99 |
| | 1 | 30 | 100 | 97 |
| | 1 | 50 | 100 | 94 |
| | 1 | 60 | 89 | 49 |
| 350 | 1 | 0.1 | 27 | 25 |
| | 1 | 0.5 | 79 | 78 |
| | 1 | 1 | 100 | 97 |
| | 1 | 10 | 100 | 99 |

Table 1-Continued

| Reaction temperature (°C.) | Mol ratio of the starting material to steam | | Conversion (%) of N-acetyl-ε-caprolactam | Yield (%) of ε-caprolactam |
|---|---|---|---|---|
| | N-acetyl-ε-caprolactam (mol) | Steam (mol) | | |
| | 1 | 30 | 100 | 98 |
| | 1 | 50 | 100 | 93 |
| | 1 | 60 | 84 | 53 |
| 450 | 1 | 0.1 | 35 | 30 |
| | 1 | 0.5 | 62 | 60 |
| | 1 | 1.0 | 100 | 77 |
| | 1 | 10 | 100 | 79 |
| | 1 | 30 | 100 | 73 |
| | 1 | 50 | 100 | 70 |
| 500 | 1 | 30 | 100 | 61 |
| | 1 | 50 | 100 | 43 |

As apparent from the results shown in Table 1, the reaction temperature is preferably 150° to 450°C. or more preferably 200° to 350°C. The amount of water vapor or steam is preferably 0.5 to 50 mols, more preferably 1 to 30 mols per mol of the starting compound.

EXAMPLE 3

The same apparatus as in Example 1 was used and a zeolite was used as the catalyst. For preparing the zeolite catalyst, Molecular Sieve 13X (Na-type) which is an X-type zeolite produced by Union Carbide Corporation was treated as follows. Thus, 20 g. of a powder of Molecular Sieve 13X were dipped in 300 ml. of a 7.0 percent (by weight) aqueous solution of magnesium nitrate and left standing overnight. Then the powder was separated by filtration and washed with water to have the remaining salt removed. Then it was dried at 110°C. molded and crushed to be 14 to 35 meshes. The powder was then roasted in an electric kiln at 600°C. for 2.5 hours. The level of exchange ($Mg^{++}$ for $Na^+$) which is the percentage of the original sodium ion replaced by magnesium cation was 83 percent.

The reaction was conducted by using 5.0 g. of the above prepared magnesium substituted zeolite. Thus 15.5 g. (0.1 mol) of N-acetyl-ε-caprolactam and 36.0 g. (2.0 mols) of steam (water vapor) were mixed together and the mixture was fed at a predetermined rate into the reactor over 2 hours to cause reaction at a reaction temperature of 300°C., and under a reaction pressure of 20 mm.Hg. As a result, 50.0 g. of a reaction product were obtained. The analysis of this reaction product indicated the conversion of N-acetyl-ε-caprolactam to be 100 percent. The yield of ε-caprolactam was 11.1 g. (98.3 percent).

EXAMPLE 4

Molecular Sieve 13X having had the sodium ions exchanged for various cations was used as the catalyst. For the ion exchange, 10 g. of Molecular Sieve 13X was treated in the same way as in Exchange 3 with an aqueous solution of 50 milliequivalents of the corresponding salt.

The same reaction apparatus as in Example 1 was used and the other reaction conditions were the same as in Example 3. The results are shown in Table 2.

Table 2

| Salt used in the ion exchanging treatment | Exchanged cation | Ion exchange rate (%) | Reaction temperature (°C.) | Conversion (%) of N-acetyl-ε-caprolactam | Yield (%) of ε-caprolactam |
| --- | --- | --- | --- | --- | --- |
| Ammonium nitrate | Hydrogen | 87 | 300 | 100 | 99 |
| Calcium nitrate | Calcium | 93 | do. | 100 | 99 |
| Zinc nitrate | Zinc | 74 | do. | 100 | 97 |
| Silver nitrate | Silver | 72 | do. | 100 | 97 |
| Palladium nitrate | Palladium | 81 | do. | 100 | 98 |
| Cadmium nitrate | Cadmium | 76 | do. | 100 | 97 |
| Copper nitrate | Copper | 83 | do. | 100 | 97 |
| Ammonium molybdate | Molybdenum | 78 | do. | 100 | 98 |
| Ammonium tungstate | Tungsten | 77 | do. | 100 | 98 |
| Cerium nitrate | Cerium | 95 | do. | 100 | 99 |
| Lanthanum nitrate | Lanthanum | 92 | do. | 100 | 99 |
| Neodium nitrate | Neodium | 90 | do. | 100 | 97 |
| None | Unreacted (control) | 0 | do. | 6 | 2 |

As apparent also from the results shown in Table 2, the effect of the zeolite catalyst ion-exchanged for the above mentioned specific cations is remarkable.

EXAMPLE 5

Reactions were carried out by varying the amount of steam in respect of N-acetyl-ε-caprolactam, and by using 5.0 g. of a zeolite catalyst having had the sodium ions substituted with calcium ions and using the same reaction apparatus as in Example 1.

In this case, the calcium substituted zeolite catalyst was prepared by filling 100 g. of Molecular Sieve SK-40 (a Y-type zeolite produced by Union Carbide Corporation, U.S.A.) into a column, flowing 2.50 liters of a 4.5 percent aqueous solution of calcium nitrate gradually from the upper part of the column to exchange ions and then carrying out the same treatment as in Example 3. The level of ion exchange ($Ca^{++}$ for $Na^+$) was 76 percent.

15.5 g. (0.1 mol) of the starting material N-acetyl-ε-caprolactam were fed at a fixed velocity together with steam into the reactor over 90 minutes to cause reaction at 300°C. under a pressure of 40 mm.Hg. The results are shown in Table 3.

Table 3

| Mol ratio of the starting material to steam | | Conversion (%) of N-acetyl-ε-caprolactam | Yield (%) of ε-caprolactam |
| --- | --- | --- | --- |
| N-acetyl-ε-caprolactam (mol) | Steam (mol) | | |
| 1 | 0.1 | 15 | 14 |
| 1 | 0.5 | 65 | 63 |
| 1 | 1 | 95 | 93 |
| 1 | 10 | 100 | 98 |
| 1 | 30 | 100 | 98 |
| 1 | 50 | 100 | 91 |
| 1 | 60 | 89 | 53 |
| 1 | 0 | 4 | 0 |

It will be noted from the above that the mol ratio of N-acetyl-ε-caprolactam to steam (water vapor) is preferably 1:0.5 to 1:50 or more preferably 1:1 to 1:30.

EXAMPLE 6

Reactions were carried out in the same manner as in Example 5 using the catalyst having had the sodium ions substituted with calcium ions which was used in Example 5, except that the reaction temperature was varied. The results are shown in Table 4.

Table 4

| Reaction temperature (°C.) | Mol ratio of the starting material to steam | | Conversion (%) of N-acetyl-ε-caprolactam | Yield (%) of ε-caprolactam |
| --- | --- | --- | --- | --- |
| | N-acetyl-ε-caprolactam (mol) | Steam (mol) | | |
| 130 | 1 | 10 | 22 | 19 |
| 150 | 1 | 10 | 74 | 71 |
| 200 | 1 | 10 | 98 | 96 |
| 300 | 1 | 10 | 100 | 98 |
| 350 | 1 | 10 | 100 | 96 |
| 450 | 1 | 10 | 100 | 74 |
| 500 | 1 | 10 | 100 | 53 |

As apparent from the results shown in Table 4, the reaction temperature is preferably 150° to 450°C. or more preferably 200° to 350°C.

EXAMPLE 7

10 g. of aluminum oxide of 14 to 35 meshes produced by dehydrating alumina hydrate were filled into a column and 100 ml. of a 2 percent aqueous solution of hydrofluoric ammonium were gradually passed therethrough. Then the treated powder was dried at 110°C. and roasted at 550°C. for 2 hours. The fluorine content of the resulting catalyst was 17 percent by weight.

The reaction was carried out with the same apparatus as in Example 1 by using 5.0 g. of the above prepared fluorine-containing alumina catalyst.

Thus a gaseous mixture of 15.5 g. (0.1 mol) of N-acetyl-ε-caprolactam and 9.0 g. (0.5 mol) of steam was fed at a predetermined rate into the reactor for 90 minutes to cause reaction at 270°C. under a pressure of 50 mm.Hg.

The conversion of N-acetyl-ε-caprolactam was 100 percent and the yield of ε-caprolactam was 11.0 g. (97.5 percent).

For comparison, 10 g. of aluminum oxide of 14 to 35 meshes were filled in the same reaction tube and a gaseous mixture of 15.5 g. of N-acetyl-ε-caprolactam and 9.0 g. of steam was fed in the reactor under the same conditions as mentioned above. The conversion of N-acetyl-ε-caprolactam was 32 percent and the yield of ε-caprolactam was 13 percent.

EXAMPLE 8

Reactions were carried out in the same manner as in Example 7 except that the amount of steam in respect of N-acetyl-ε-caprolactam was varied. The results are shown in Table 5.

Table 5

| Mol ratio of the starting material to steam | | Conversion (%) of N-acetyl-ε-caprolactam | Yield (%) of ε-caprolactam |
|---|---|---|---|
| N-acetyl-ε-caprolactam (mol) | Steam (mol) | | |
| 1 | 0.1 | 18 | 16 |
| 1 | 0.5 | 66 | 64 |
| 1 | 1 | 96 | 94 |
| 1 | 10 | 100 | 97 |
| 1 | 30 | 100 | 99 |
| 1 | 50 | 100 | 92 |
| 1 | 40 | 94 | 51 |
| 1 | 0 | 3 | 0 |

As apparent from the above table, the mol ratio of N-acetyl-ε-caprolactam to steam is preferably 1:0.5 to 1:50 or more preferably 1:1 to 1:30.

EXAMPLE 9

20 g. of a silica gel produced by neutralizing water glass with sulfuric acid were dipped in 400 ml. of a 40 percent aqueous solution of zirconium nitrate. The treated product was separated by filtration, washed, dried at 110°C. and then roasted at 700°C. for 3 hours. The ratio of $SiO_2/ZrO_2$ by weight of the obtained silica-zirconia catalyst was 1.0

The reaction was carried out with the same reaction apparatus as in Example 1 by using 5 g. of the above prepared catalyst (14 to 35 meshes).

Thus a gaseous mixture of a mol ratio of N-acetyl-ε-caprolactam:steam:nitrogen gas of 0.1:1.0:1.0 was fed into the reactor at a predetermined rate and 15.5 g. of N-acetyl-ε-caprolactam were made to react for 2 hours.

The reaction rate of N-acetyl-ε-caprolactam was 100 percent, the yield of ε-caprolactam was 11.0 g. (97.5 percent).

EXAMPLE 10

The reaction was carried out under the same conditions as in Example 9 except that the amount of steam to be fed together with the starting material N-acetyl-ε-caprolactam was varied. The results are shown in Table 6.

Table 6

| Mol ratio of the starting material to steam | | Conversion (%) of N-acetyl-ε-caprolactam | Yield (%) of ε-caprolactam |
|---|---|---|---|
| N-acetyl-ε-caprolactam (mol) | Steam (mol) | | |
| 1 | 0.1 | 11 | 10 |
| 1 | 0.5 | 53 | 52 |
| 1 | 1 | 90 | 88 |
| 1 | 10 | 100 | 97 |
| 1 | 30 | 100 | 97 |
| 1 | 50 | 100 | 89 |
| 1 | 60 | 91 | 42 |
| 1 | 0 | 5 | 0 |

From the above it will be noted that the mol ratio of N-acetyl-ε-caprolactum to steam is preferably 1:0.5 to 1:50 or more preferably 1:1 to 1:30.

EXAMPLE 11

80 g. of magnesia (MgO) and 150 ml. of a 20 percent aqueous solution of magnesium chloride were mixed together and 800 ml. of water were gradually added thereto to render the mixture to be colloidal. An alkaline silica hydrogel prepared by adding 230 g. of 40 percent sulfuric acid to 7 kg. of water glass (280 g. as silica) was added to the mixture and the mixture was kneaded. The kneaded mixture was filtered and dried to obtain a half-dried hydrogel. It was washed with water, treated with 1 liter of a 10 percent aqueous solution of magnesium chloride so as to have the ions exchanged and was then again dispersed in warm water. Then it was dried at 110°C., molded and was then roasted at 550°C. for 3 hours so as to be activated. The weight ratio of $SiO_2/MgO$ in the resulting catalyst was 3.0.

The reaction was carried out by using 5 g. of the thus prepared silica-magnesia catalyst (14 to 35 meshes) and with the same apparatus as in Example 1.

Thus a gaseous mixture of 15.5 g. (0.1 mol) of N-acetyl-ε-caprolactam and 54.0 g. (3.0 mols) of steam was fed at a predetermined rate into the reactor for 90 minutes to cause reaction at 310°C. under a pressure of 25 mm.Hg. The conversion of N-acetyl-ε-caprolactam was 100 percent, and the yield of ε-caprolactam was 11.1 g. (98.3 percent).

EXAMPLE 12

The reaction was carried out by varying only the amount of steam in respect of N-acetyl-ε-caprolactam by using a silica-magnesia catalyst produced under the same conditions as in Example 11.

Thus a gaseous mixture of 15.5 g. (0.1 mol) of N-acetyl-ε-caprolactam and steam was fed into the reactor over 90 minutes to cause reaction at 260°C. under a reaction pressure of 20 mm.Hg. The results are shown in Table 7.

Table 7

| Mol ratio of the starting material to steam | | Conversion (%) of N-acetyl-ε-caprolactam | Yield (%) of ε-caprolactam |
|---|---|---|---|
| N-acetyl-ε-caprolactam (mol) | Steam (mol) | | |
| 1 | 0.1 | 8 | 8 |
| 1 | 0.5 | 44 | 43 |
| 1 | 1 | 88 | 86 |
| 1 | 10 | 100 | 97 |
| 1 | 30 | 100 | 97 |

Table 7-Continued

| Mol ratio of the starting material to steam | | Conversion (%) of N-acetyl-ε-caprolactam | Yield (%) of ε-caprolactam |
|---|---|---|---|
| N-acetyl-ε-caprolactam (mol) | Steam (mol) | | |
| 1 | 50 | 100 | 90 |
| 1 | 60 | 87 | 36 |
| 1 | 0 | 1 | 0 |

EXAMPLE 13

60 g. of aluminum oxide produced by dehydrating alumina hydrate and 40 g. of boric acid were mixed to form a paste with a small amount of water. The paste was molded into pellets, then dried at 120°C. and calcined at 500°C. for 3 hours. 5 g. of the thus prepared alumina-boria catalyst (14 to 35 meshes) were packed in the same reaction apparatus as in Example 1.

Then 15.5 g. (0.1 mol) of N-acetyl-ε-caprolactam were fed in the reactor at a predetermined rate and at the same time a required amount of steam was also fed in the reactor. The reaction temperature was 300°C. and the reaction pressure was 20 mm.Hg. The mol ratio of N-acetyl-ε-caprolactam to steam was varied. The results are shown in Table 8.

Table 8

| Mol ratio of the starting material to steam | | Conversion (%) of N-acetyl-ε-caprolactam | Yield (%) of ε-caprolactam |
|---|---|---|---|
| N-acetyl-ε-caprolactam (mol) | Steam (mol) | | |
| 1 | 0.1 | 11 | 10 |
| 1 | 0.5 | 59 | 57 |
| 1 | 1 | 90 | 87 |
| 1 | 10 | 100 | 98 |
| 1 | 30 | 100 | 97 |
| 1 | 50 | 100 | 91 |
| 1 | 60 | 82 | 41 |
| 1 | 0 | 3 | 10 |

As apparent from the above, the mol ratio of N-acetyl-ε-caprolactam to steam is preferably 1:0.5 to 1:50 or more preferably 1:1 to 1:30.

EXAMPLE 14

Reactions were carried out in the same manner as in Example 13 by using the alumina-boria catalyst of Example 13 except that the reaction temperature was varied and the mol ratio of N-acetyl-ε-caprolactam to steam was made 1:10. The results are shown in Table 9.

Table 9

| Reaction temperature (°C.) | Conversion (%) of N-acetyl-ε-caprolactam | Yield (%) of ε-caprolactam |
|---|---|---|
| 130 | 17 | 14 |
| 150 | 71 | 68 |
| 200 | 99 | 95 |
| 300 | 100 | 97 |
| 350 | 100 | 96 |
| 450 | 100 | 72 |
| 500 | 100 | 40 |

EXAMPLE 15

20 g. of phosphoric acid were added to 100 g. of aluminum oxide of 14 to 35 meshes. The mixture was dried at 110°C. and was then calcined at 500°C. for 25 hours. A series of reactions were carried out by using 5 g. of the above prepared alumina carried phosphoric acid in the reaction apparatus of Example 1. The mol ratio of N-acetyl-ε-caprolactam was varied.

Thus a gaseous mixture of 15.5 g. of N-acetyl-ε-caprolactam and a predetermined amount of steam was fed at a predetermined rate into the reactor for 90 minutes to cause reaction at 270°C. and under pressure of 30 mm.Hg. The results are shown in Table 10.

Table 10

| Mol ratio of the starting material to steam | | Conversion (%) of N-acetyl-ε-caprolactam | Yield (%) of ε-caprolactam |
|---|---|---|---|
| N-acetyl-ε-caprolactam (mol) | Steam (mol) | | |
| 1 | 0.1 | 14 | 13 |
| 1 | 0.5 | 62 | 59 |
| 1 | 1 | 93 | 91 |
| 1 | 10 | 100 | 98 |
| 1 | 30 | 100 | 99 |
| 1 | 50 | 100 | 91 |
| 1 | 60 | 83 | 45 |
| 1 | 0 | 2 | 0 |

EXAMPLE 16

200 ml. of 5 percent caustic soda solution were added to 100 g. of aluminum oxide and the mixture was dried at 110°C. and was heat-treated at 500°C. for 3 hours.

Reactions were carried out by using 5 g. of the above prepared alumina carried caustic soda catalyst and varying the mol ratio of water vapor to N-acetyl-ε-caprolactam. By using the reaction apparatus of Example 1, a gaseous mixture of 15.5 g. of N-acetyl-ε-caprolactam and a required amount of steam was fed at a predetermined rate into the reactor for 2 hours to cause reaction at 230°C. and under a pressure of 5 mm.Hg. The results are shown in Table 11.

Table 11

| Mol ratio of the starting material to steam | | Conversion (%) of N-acetyl-ε-caprolactam | Yield (%) of ε-caprolactam |
|---|---|---|---|
| N-acetyl-ε-caprolactam (mol) | Steam (mol) | | |
| 1 | 0 | 3 | 0 |
| 1 | 0.1 | 13 | 12 |
| 1 | 0.5 | 61 | 60 |
| 1 | 1 | 94 | 92 |
| 1 | 10 | 100 | 99 |
| 1 | 30 | 100 | 98 |
| 1 | 50 | 100 | 89 |
| 1 | 60 | 83 | 52 |

From the above results, it will be noted that the mol ratio of N-acetyl-ε-caprolactam to steam is preferably 1:0.5 to 1:50 or more preferably 1:1 to 1:30.

EXAMPLE 17

100 ml. of a 5 percent aqueous solution of potassium hydroxide were added to 100 g. of a silica gel (14 to 15 meshes) and the mixture was dried at 110°C. and was then heat-treated at 500°C. for 2.5 hours.

Reactions were carried out by using 5 g. of the above obtained silica carried caustic soda catalyst and varying the amount of steam in respect of the starting material.

Thus, by using the reaction apparatus of Example 1, a gaseous mixture of 15.5 g. of N-acetyl-ε-caprolactam and a required amount of steam was fed at a predetermined rate into the reactor for 2 hours to cause reaction at 200°C. and under a pressure of 30 mm.Hg. The results are shown in Table 12.

Table 12

| Mol ratio of the starting material to steam | | Conversion (%) of N-acetyl-ε-caprolactam | Yield (%) of ε-caprolactam |
|---|---|---|---|
| N-acetyl-ε-caprolactam (mol) | Steam (mol) | | |
| 1 | 0.1 | 15 | 14 |
| 1 | 0.5 | 63 | 61 |
| 1 | 1 | 95 | 91 |
| 1 | 10 | 100 | 98 |
| 1 | 30 | 100 | 97 |
| 1 | 50 | 100 | 90 |
| 1 | 60 | 86 | 46 |
| 1 | 0 | 4 | 0 |

As is apparent from Table 12, the amount of steam is preferably 1 to 50 mols per mol of N-acetyl-ε-caprolactam.

The, for comparison, a reaction was carried out in the same manner as mentioned above by using a silica gel carrying no potassium hydroxide (silica gel only) except that the mol ratio of N-acetyl-ε-caprolactam to steam was made 1:10. The conversion of N-acetyl-ε-caprolactam was 26 percent and the yield of ε-caprolactam was only 8 percent.

EXAMPLE 18

The reactions were carried out by using a catalyst prepared in the same manner as in Example 17 so that 100 g. of alumina (14 to 35 meshes) would carry 10 g. of each of lithium hydroxide, barium hydroxide, sodium carbonate, potassium carbonate, sodium acetate and potassium acetate.

A gaseous mixture of 15.5 g. (0.1 mol) of N-acetyl-ε-caprolactam and a required amount of steam was fed into the reactor for 2 hours to cause reaction at 250°C. under a pressure of 20 mm.Hg by using each of the above prepared catalysts. The same reaction apparatus as in Example 1 was used. The results are shown in Table 13.

Table 13

| Basic catalyst (carried by alumina) | Mol ratio of the starting material to steam | | Conversion (%) of N-acetyl-ε-caprolactam | Yield (%) of ε-caprolactam |
|---|---|---|---|---|
| | N-acetyl-ε-caprolactam (mol) | Steam (mol) | | |
| Lithium hydroxide | 1 | 0.1 | 14 | 14 |
| | 1 | 0.5 | 66 | 64 |
| | 1 | 1 | 88 | 86 |
| | 1 | 10 | 100 | 97 |
| | 1 | 30 | 100 | 97 |
| | 1 | 50 | 100 | 92 |
| | 1 | 60 | 75 | 47 |
| Barium hydroxide | 1 | 0.1 | 18 | 17 |
| | 1 | 0.5 | 68 | 67 |
| | 1 | 1 | 91 | 90 |
| | 1 | 10 | 100 | 99 |
| | 1 | 30 | 100 | 97 |
| | 1 | 50 | 100 | 91 |
| | 1 | 60 | 68 | 43 |
| | 1 | 0.1 | 12 | 12 |
| | 1 | 0.5 | 54 | 53 |
| Sodium carbonate | 1 | 1 | 84 | 82 |
| | 1 | 10 | 93 | 91 |
| | 1 | 30 | 100 | 96 |
| | 1 | 50 | 100 | 92 |
| | 1 | 60 | 83 | 47 |
| | 1 | 0.1 | 9 | 9 |
| | 1 | 0.5 | 52 | 50 |
| | 1 | 1 | 82 | 81 |
| Potassium carbonate | 1 | 10 | 92 | 90 |
| | 1 | 30 | 100 | 97 |
| | 1 | 50 | 100 | 89 |
| | 1 | 60 | 86 | 41 |
| Sodium acetate | 1 | 10 | 62 | 43 |
| Potassium acetate | 1 | 10 | 60 | 41 |

As apparent also from the results in the above table, the effect of the basic catalyst is remarkable.

EXAMPLE 19

The reactions were carried out by varying the reaction temperature and by using a catalyst prepared in the same manner as in Example 16 so that 100 g. of each of carriers of celite and active carbon (14 to 35 meshes) would carry 10 g. of sodium hydroxide.

Thus 3 g. of each catalyst were packed in the reaction tube of Example 1 and then a gaseous mixture of 7.8 g. (0.05 mol) of N-acetyl-ε-caprolactam and 18 g. (1.0 mol) of steam was fed at a predetermined rate in the reactor for 1 hour. The results are shown in Table 14.

Table 14

| Carrier | Reaction temperature (°C.) | Conversion (%) of N-acetyl-ε-caprolactam | Yield (%) of ε-caprolactam |
|---|---|---|---|
| Celite | 130 | 17 | 13 |
| | 150 | 67 | 61 |
| | 200 | 97 | 94 |
| | 300 | 100 | 97 |
| | 450 | 100 | 72 |
| | 500 | 100 | 37 |
| Active carbon | 130 | 16 | 10 |
| | 150 | 65 | 60 |
| | 200 | 96 | 93 |
| | 300 | 100 | 96 |
| | 450 | 100 | 70 |
| | 500 | 100 | 35 |

For comparison, a reaction was carried out in the same manner as mentioned above by using each of the carriers of the celite and active carbon alone instead of the above mentioned catalyst except that the reaction temperature was set at 300°C. The conversions of N-acetyl-ε-caprolactam were respectively 16 and 14 percent and the yields were respectively 7 and 5 percent.

CONTROL 1

15.5 g. (0.1 mol) of N-acetyl-ε-caprolactam were dissolved in 10 g. of tetrahydrofuran. Then 5.5 g. of 0.2 N aqueous solution of hydrochloric acid were added to the solution and the solution was made to react at 50°C. for 10 hours. After the reaction, the reaction solution was neutralized with 0.2 N-caustic soda solution and was analyzed with a gas chromatograph. The conversion of N-acetyl-ε-caprolactam was 86.5 percent, the yield of ε-caprolactam was 1.4 g. (12 percent). Further, aminocaproic acid in an amount of 41 percent on the starting material was produced as a by-product.

CONTROL 2

15.5 g. (0.1 mol) of N-acetyl-ε-caprolactam were dissolved in 15 g. of tetrahydrofuran. Then 0.4 g. of para-toluene sulfonic acid and 18.0 g. (1.0 mol) of water were added to the solution. The solution was then made to react at 40°C. for 24 hours. After the reaction, the reaction solution was analyzed. The conversion of N-acetyl-ε-caprolactam was 78.8 percent, and the yield of ε-caprolactam was 1.8 g. (16 percent). Further, aminocaproic acid in an amount of 42 percent on the starting material was produced as a by-product.

CONTROL 3

15.5 g. (0.1 mol) of N-acetyl-ε-caprolactam were dissolved in 10 g. of tetrahydrofuran. Then 9.5 g. of 0.2 N caustic soda solution were added to the solution. The solution was thus made to react at 40°C. for 24 hours. The reaction solution was neutralized and was then analyzed. The conversion of N-acetyl-ε-caprolactam was 89.3 percent, and the yield of ε-caprolactam was 9 g. (8 percent). Further, aminocaproic acid in an amount of 45 percent on the starting material was produced as a by-product.

CONTROL 4

15.5 g. (0.1 mol) of N-acetyl-ε-caprolactam were dissolved in 10 g. of tetrahydrofuran. Then 10 g. of 0.2 N phosphoric acid were added to the solution. The solution was made to react at 40°C. for 24 hours. The reaction solution was neutralized and was then analyzed. The conversion of N-acetyl-ε-caprolactam was 81.0 percent, and the yield of ε-caprolactam was 9 g. (8 percent). Further, aminocaproic acid in an amount of 40 percent on the starting material was produced.

What is claimed is:

1. A process for producing ε-caprolactam which comprises bringing N-acetyl-ε-caprolactam into contact in the gaseous phase with
   a. an acid catalyst selected from the group consisting of
      i. silica-alumina catalysts wherein the $SiO_2: Al_2O_3$ ratio is 10:90 to 99:1 based on weight
      ii. zeolite catalysts which contain at least one cation selected from the group consisting of hydrogen, calcium, magnesium, zinc, silver, palladium, cadmium, copper, molybdenum, tungsten, cerium, lanthanum and neodymium
      iii. silica-magnesia catalysts wherein the $SiO_2:MgO$ ratio is 0.5:1 to 5:1 based on weight
      iv. silica-zirconia catalysts wherein the $SiO_2:ZrO_2$ ratio is 9:1 to 0.2:1 based on weight.
      v. alumina-boria catalysts wherein the $Al_2O_3: B_2O_3$ ratio is 99:1 to 40:60 based on weight
      vi. alumina catalysts containing fluorine wherein the $Al_2O_3:F$ ratio is 99.95:0.05 to 70:30 based on weight
      and
      vii. phosphoric acid catalysts supported by a carrier wherein the ratio of carrier:phosphoric acid is 1:0.1 to 1:10 based on weight
   or
   b. a basic catalyst selected from the group consisting of sodium hydroxide, potassium hydroxide, lithium hydroxide, barium hydroxide, sodium carbonate and potassium carbonate, supported on a carrier in the presence of steam wherein the molar ratio of N-acetyl-ε-caprolactam to steam is 1:0.5 to 1:50; the reaction temperature being 150° to 450°C, said contact being conducted at a pressure of 0.1 to 1,000 mm Hg.

2. A process according to claim 1 wherein the feed ratio is 0.1 to 50 kg./hour per kg. of the catalyst.

3. A process according to claim 2 wherein the catalyst is a silica-alumina catalyst wherein the $SiO_2: Al_2O_3$ ratio is 10:90 to 99:1 based on weight.

4. A process according to claim 2 wherein the catalyst is a zeolite catalyst which contains at least one cation selected from the group consisting of hydrogen, calcium, magnesium, zinc, silver, palladium, cadmium, copper, molybdenum, tungsten, cerium, lanthanum and neodymium.

5. A process according to claim 2 wherein the catalyst is a silica-magnesia catalyst wherein the $SiO_2:MgO$ ratio is 0.5:1 to 5:1 based on weight.

6. A process according to claim 2 wherein the catalyst is a silica-zirconia catalyst wherein the $SiO_2:ZrO_2$ ratio is 9:1 to 0.2:1 based on weight.

7. A process according to claim 2 wherein the catalyst is an alumina-boria catalyst wherein the $Al_2O_3: B_2O_3$ ratio is 99:1 to 40:60 based on weight.

8. A process according to claim 2 wherein the catalyst is an alumina catalyst containing fluorine wherein the $Al_2O_3:F$ ratio is 99.95:0.05 to 70:30 based on weight.

9. A process according to claim 1 wherein the catalyst is a phosphoric acid catalyst supported by a carrier wherein the ratio of carrier:phosphoric acid is 1:0.1 to 1:10 based on weight.

10. A process according to claim 1 wherein the catalyst is a basic catalyst selected from the group consisting of sodium hydroxide, potassium hydroxide, lithium hydroxide, barium hydroxide, sodium carbonate and potassium carbonate, supported on a carrier.

* * * * *